United States Patent [19]

Rupp

[11] 4,349,374

[45] Sep. 14, 1982

[54] METHOD AND APPARATUS FOR MANUFACTURING GLASS PROGRESSIVE LENSES

[75] Inventor: Wiktor J. Rupp, Hollywood, Fla.

[73] Assignee: Camelot Industries Corporation, Burlington, Mass.

[21] Appl. No.: 226,965

[22] Filed: Jan. 21, 1981

[51] Int. Cl.³ .............................................. C03B 23/00
[52] U.S. Cl. .......................................... 65/107; 65/39; 65/273; 65/287
[58] Field of Search ...................... 65/37, 39, 107, 106, 65/273, 287, 102

[56] References Cited

U.S. PATENT DOCUMENTS

| | | | |
|---|---|---|---|
| 2,377,849 | 6/1945 | Binkert et al. | 65/107 X |
| 2,869,422 | 1/1959 | Cretin-Maitenaz | |
| 3,607,186 | 9/1971 | Bognar | 65/107 X |
| 3,623,800 | 11/1971 | Volk | 351/169 |
| 3,778,244 | 12/1973 | Nedelec et al. | 65/106 |
| 3,853,499 | 12/1974 | Larson et al. | 51/33 R |
| 3,889,431 | 6/1975 | Johnson | 65/37 X |
| 3,913,278 | 10/1975 | Railford et al. | 51/58 |
| 4,050,192 | 9/1977 | Volk | 51/31 R |

FOREIGN PATENT DOCUMENTS 1234272 6/1971 United Kingdom.

Primary Examiner—Arthur D. Kellogg
Attorney, Agent, or Firm—Hamilton, Brook, Smith & Reynolds

[57] ABSTRACT

Method and apparatus for manufacturing glass progressive power lenses. The lenses are manufactured by a vacuum forming technique in which a glass lens is placed upon a forming block, heated to its softening point, and then forced to sag against and assume the shape of the forming block surface by the creation of a vacuum between the lens blank and the block surface. The forming block is provided with a plurality of apertures through which the vacuum is drawn and these apertures are positioned so as to ensure the maintenance of an adequate pressure differential between the two surfaces of the lens blank as it sags in a wave-like manner from its center towards its periphery. This will ensure that the blank will sag evenly and smoothly against the forming block and in general, enables glass progressive lenses to be manufactured by the vacuum forming technique notwithstanding the fact that the shape of such lenses would normally not permit creation of the necessary vacuum force between the forming block and the lens blank to effect proper sagging.

13 Claims, 5 Drawing Figures

METHOD AND APPARATUS FOR MANUFACTURING GLASS PROGRESSIVE LENSES

TECHNICAL FIELD

The present invention relates generally to the manufacture of glass progressive power lenses, and, more particularly, to a method and apparatus for manufacturing glass progressive power ophthalmic lenses by a vacuum forming technique.

BACKGROUND ART

There are basically two methods for producing the non-spherical surface of a glass progressive power ophthalmic lens. According to one, the surface of the lens is simply ground and polished to the desired curvature, and examples of this method are shown in U.S. Pat. Nos. 2,869,422; 3,623,800; 3,853,499; 3,913,274 and 4,050,192. The second method consists of gravity sagging a lens blank having an originally polished spherical surface onto a forming block shaped to provide the polished surface with the desired progressive shape after sagging. This technique is mentioned in British Pat. No. 1,234,272.

Neither of these two methods is very satisfactory for a number of reasons. The grinding method, for example, requires the use of complex surfacing equipment. The gravity sagging technique, on the other hand, because of the irregular shape of progressive lenses, requires that the lens be softened to such an extent that it becomes highly susceptible to having its surface damaged. In addition, neither method provides enough flexibility to permit the manufacture of a lens design which can disregard manufacturing requirements and address only optical requirements. In other words, the present methods do not permit optimization of the lens design because of limitations placed on the design by manufacturing requirements.

DISCLOSURE OF THE INVENTION

In accordance with the present invention, glass progressive power lenses are manufactured by a vacuum forming technique. In particular, a lens blank having a polished spherical convex surface and a fine ground or polished spherical concave surface is placed upon a forming block with the concave surface of the blank resting upon the block. The assembly is then heated to soften the lens blank and a vacuum force is applied to cause the blank to sag against the forming block. The surface of the forming block is provided with a geometry that will cause the convex side of the blank, when sagged, to assume the desired progressive surface shape, such that after cooling, a completed progressive power lens surface is provided.

The forming block is provided with a plurality of apertures through which the vacuum is drawn so as to ensure the maintenance of an adequate pressure differential between the two surfaces of the lens blank as the blank sags to ensure the blank will sag properly and completely against the forming block. Further details of this and other features of the invention will be set out hereinafter in conjunction with the description of the best mode for carrying out the invention.

BEST MODE FOR CARRYING OUT THE INVENTION

The vacuum forming of glass objects is a generally well-known process, and typically consists of forcing the glass object to assume the shape of a mold by creating a partial vacuum condition between the glass object and the mold after the glass has been heated to its softening point. This commonly understood technique, however, cannot be practically applied to the manufacture of glass progressive power lenses because the particular shape of such a lens does not permit creation of the necessary vacuum between the sagging block and the lens blank.

Figure 1:
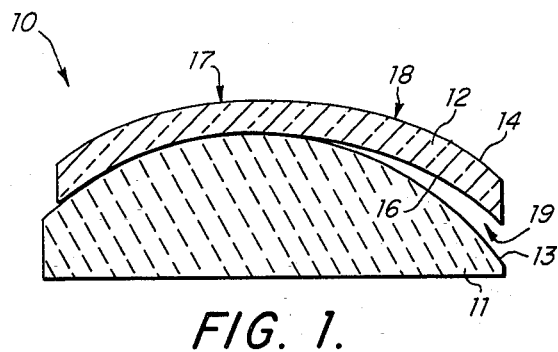
FIG. 1 illustrates, in schematic cross-sectional form and without any details, a typical assembly consisting of a lens forming block and a lens blank.

By the present invention, however, a vacuum forming technique is provided which, with the use of a novel forming block construction, permits glass progressive power lenses to be manufactured accurately and efficiently. This invention is illustrated in the FIGS. with FIG. 1 showing, in schematic form, an assembly 10 consisting of a lens forming block 11, and a lens blank 12. Forming block 11 may be of conventional ceramic construction and has a forming surface 13 upon which the lens blank is supported. Lens blank 12 is of glass and, is preferably provided with two spherical surfaces, spherical convex surface 14 which should be ground and polished to a fully finished condition, and spherical concave surface 16 which is preferably fine ground although it may be finished to a greater extent if desired.

Since the principal object of the present invention is to manufacture progressive power ophthalmic lenses, the surface 13 of the lens forming block is provided with a shape (by use of a numerical grinding machine, for example) which, after sagging, will cause the convex surface 14 of the lens blank 12 to assume the desired final shape.

In the embodiment illustrated, the final lens surface will have a distance portion 17, which will constitute the top half of the lens surface, and be of spherical shape, while the bottom half 18 of the lens surface will contain the spherical reading portion and the non-spherical progressive portion.

In practicing the method, the concave and convex surfaces of the lens blank will be initially provided with spherical curvatures corresponding to that ultimately desired for the distance portion 17 of the surface 14. When the blank is then placed on the forming surface 13 of forming block 11, this portion of the lens blank will lie in intimate contact with the forming block and remain unchanged during the entire process. The bottom half 18 of the lens blank, however, will hang over the forming surface 13 as shown in FIG. 1 resulting in a space 19 between the lens blank 12 and the forming block surface 13. Because of the particular shape of the surfaces 13 and 16, this space cannot effectively be sealed off, and consequently, it is not possible to create a vacuum in this space in the normal way to draw the lens blank into contact with surface 13 and to thus shape the lens by conventional vacuum forming techniques.

Figure 2:
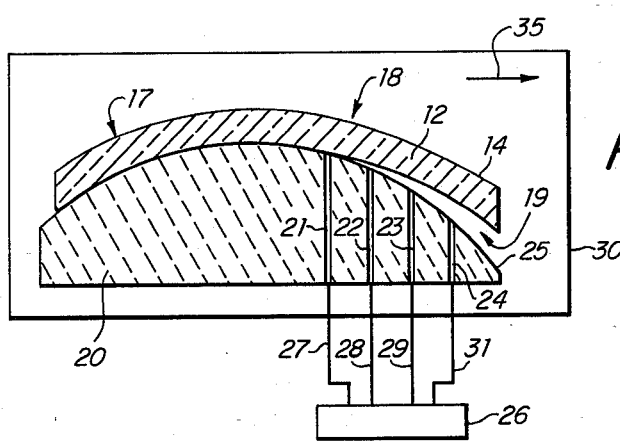
FIG. 2 schematically illustrates an assembly comprising a lens forming block and a lens blank in accordance with one embodiment of the present invention.

This problem has been overcome by the method and apparatus illustrated in FIG. 2. Specifically, in FIG. 2 the forming block 20 is equipped with a number of apertures 21, 22, 23 and 24, which extend from forming surface 25, through the block and are coupled to a vacuum pump 26 through appropriate couplings 27, 28, 29 and 31, respectively.

Aperture 21, is in the vicinity where the distance portion 17 of the lens blank rests upon forming surface 25, where the gap 19 between the blank and the forming block surface is very narrow. When the glass is softened by heating (by placing the entire assembly in an oven as represented by block 30 for example), typically to between 680° and 710° C. for ophthalmic crown glass, the vacuum force applied through hole 21 will generate a sufficient pressure differential between the two sides of the lens blank so as to force the blank down against the surface 25 of the forming block. When this happens, the hole 21 will be sealed off by the lens blank and thereafter become ineffective. At the same time, however, the entire bottom half 18 of the blank will be lowered by a sufficient amount so as to narrow the gap between the lens blank and the second hole 22 so that the vacuum force applied through this hole will become sufficient to draw the blank down further and the process will be repeated. Thereafter, holes 23 and 24 will also perform the same action in sequence until, eventually, the entire bottom half of the lens blank will be caused to conform to the surface 25 of the lens forming block.

In effect, by the present invention, the lens blank is caused to sag from its center toward its lower edge (in the direction indicated by arrow 35) in a wave-like manner rather than all at once. Besides resulting in a smooth and even forming of the lens blank this process has the additional advantage of preventing any air pockets or bubbles from forming between the forming surface and the lens blank as such air pockets would tend to be pushed out as the lens blank sags.

Figure 3:
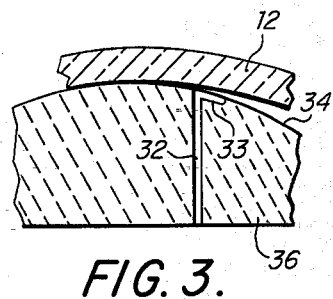
FIG. 3 schematically illustrates a section of a lens forming block-lens blank assembly showing a feature of the present invention.

In order to increase the spatial action of the holes, one or more of them (e.g. hole 32 in FIG. 3) can be provided with short grooves 33 engraved on the forming surface 34 of the forming block 36 and connected to the holes as is illustrated in FIG. 3. In the FIG. 2 embodiment, once a hole is sealed off, it will have no further effect in the forming process. In the embodiment of FIG. 3, however, the effect of the vacuum will be extended to a larger area of the blank.

An effective system does not require that the entire surface of the forming block be formed with holes and grooves. It has been shown that it will be sufficient if merely a few holes and grooves are provided along lines which follow the maximum gap distance between the forming block surface and the lens blank as the process of sealing is carried out. If the blank is forced to conform to the block along these lines, it has been shown that it will naturally conform to the remaining areas of the block.

Figure 4:
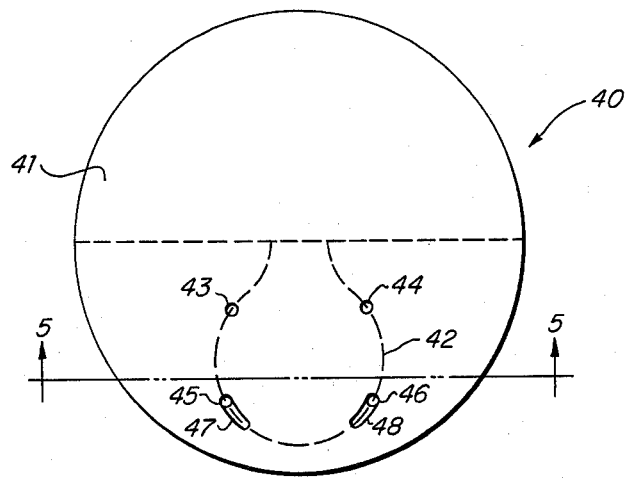
FIG. 4 illustrates a top view of a lens forming block according to a presently most preferred embodiment of the invention.
Figure 5:
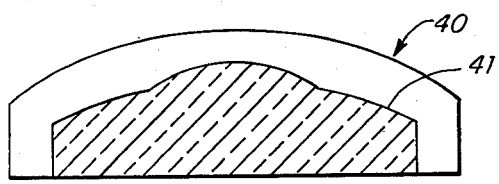
FIG. 5 illustrates a cross-sectional view of the forming block of FIG. 4 looking in the direction of arrows 5—5 of FIG. 4.

FIGS. 4 and 5, accordingly, describe what is the presently most preferred embodiment of the invention. FIG. 4, specifically, illustrates a top view of the preferred forming block, while FIG. 5 illustrates a cross-section of the block of FIG. 4 looking in the direction of arrows 5—5 of FIG. 4. The line 42 around the reading portion of the surface 41 of the forming block 40 traces the area of the largest gap which the blank will encounter during the forming process. If a relatively strong vacuum is applied, e.g., a suction of 10 to 14 inches of mercury, it will be sufficient to provide the block with only four holes 43, 44, 45 and 46, with holes 45 and 46 being provided with grooves 47 and 48 to facilitate the forming process. The generally preferred location of the holes and grooves is shown in FIG. 4. It should be recognized, however, that other arrangements of grooves and holes could also be employed, and it is not intended to so limit the invention to the illustrated embodiment. The illustrated embodiment, by experiment, has simply been shown to be most preferred for the particular temperatures and pressures described above.

The holes are preferably about 1 mm in diameter and the grooves are about 1 mm wide and 1 mm deep although these dimensions are not critical. With the vacuum forming technique, it is not necessary to soften the lens blank to too great an extent, e.g. 680° C.–710° C. for ophthalmic crown glass at which temperature the blank remains of relatively firm consistency, is sufficient and, therefore, the surface 14 of the lens blank 12 will form accurately and there will be no harmful marks formed on the lens blank by the holes or grooves in the forming block (it should be remembered that surface 16 of the blank will eventually be ground to prescription in any event so some marking can be tolerated).

While what has been described above constitutes the presently most preferred embodiment of the invention, it should be recognized that the invention could take other forms. For example, although primarily designed for use in manufacturing progressive power ophthalmic lenses, it could also be used to manufacture other kinds of non-spherical lenses as well. It should, therefore, be understood that the invention should be limited only insofar as is required by the scope of the following claims.

I claim:
1. A method for manufacturing a glass lens having a spherical distance portion and a nonspherical progressive portion comprising:
   a. providing a forming block having a lens forming surface shaped for forming said spherical and nonspherical surfaces on a lens;
   b. supporting a glass lens blank on said forming surface, said lens blank and said forming surface defining a spacing therebetween adjacent the nonspherical portion;
   c. heating said glass lens blank to its softening point;
   d. simultaneously establishing a pressure differential between the opposite sides of said lens blank for causing said lens blank to sag against said forming surface by locating openings through the forming block progressing from the vicinity of where said spacing between said lens blank and said forming surface is initially relatively narrow and ending in the vicinity of where said spacing is initially relatively wide; and
   e. coupling said apertures to a pump.
2. A method as recited in claim 1 wherein said step of establishing a pressure differential comprises establishing a pressure differential which is greater in the vicinity of where said spacing is relatively narrow so that said lens blank will sag against said forming surface beginning in the vicinity of where said spacing is initially relatively narrow.

3. A method as recited in claim 2 wherein said step of establishing a pressure differential comprises maintaining a greater pressure differential by providing a vacuum from said pump at said openings in the forming block in the vicinity of where said spacing is narrowest as said lens blank sags against said forming surface to cause said lens blank to sag against said forming surface and providing a vacuum from said pump at further openings in said forming block to cause said lens blank to sag in a wave-like fashion beginning where said spacing is initially at its narrowest and ending where said spacing is initially at its widest.

4. A method as recited in claim 3 wherein said step of establishing said pressure differential comprises the step of reducing the pressure in said spacing, and wherein the reduction of pressure will be greatest in the vicinity of where said spacing is at its narrowest.

5. A method as recited in claim 1 wherein the distance portion occupies the top half of said lens and a progressive power portion and a reading portion occupying the bottom half of said lens, and wherein said step of supporting a glass lens blank on said forming surface comprises supporting said lens blank to define said spacing between the bottom half of said lens blank and said forming surface.

6. Apparatus for manufacturing a glass lens having a spherical distance portion and a nonspherical progressive portion comprising:
 a. a lens forming block having a lens forming surface shaped to form said spherical and nonspherical lens portions;
 b. a lens blank adapted to be situated above said lens forming block and supported on said lens forming surface, said lens blank and said lens forming surface defining a spacing therebetween adjacent the nonspherical portion;
 c. means for heating said lens blank to its softening point; and
 d. means for establishing a pressure differential between the opposite sides of said blank for causing said lens blank to sag against said lens forming surface, said pressure differential establishing means comprising progressive apertures extending through said lens forming block for maintaining a relatively large pressure differential in the vicinity of where said spacing is relatively narrow so that said blank will sag progressing from where said spacing is relatively narrow and ending in the vicinity of where said spacing is relatively wide.

7. Apparatus as recited in claim 6 wherein said means for creating a pressure differential comprises vacuum means for reducing the pressure in said spacing.

8. Apparatus as recited in claim 7 wherein said vacuum means includes a vacuum source connected to said plurality of apertures extending through said lens forming block, said vacuum source being in communication with said spacing through said apertures.

9. Apparatus as recited in claim 8 wherein at least one of said apertures is in communication with said spacing in the vicinity of where said spacing is initially narrowest for creating the relatively large pressure differential where the spacing is narrowest.

10. Apparatus as recited in claim 9 wherein others of said plurality of apertures are in communication with said spacing where said spacing is relatively wider, but become adjacent to where the spacing becomes narrowest as said lens blank sags against said lens forming surface in said wave-like fashion.

11. Apparatus as recited in claim 8 wherein at least some of said plurality of apertures terminate in an elongated groove formed in the lens forming surface of said forming block.

12. Apparatus as recited in claim 6 wherein said lens comprises a progressive power ophthalmic lens having a progressive power surface, and wherein said lens blank has a first concave spherical surface supported on and in contact with said forming block and a second convex spherical surface, said second convex spherical surface being fine ground and polished and adapted to assume said progressive power surface after sagging.

13. Apparatus as recited in claim 12 wherein said lens blank is made of ophthalmic crown glass and wherein said heating means comprises an oven for heating said lens blank to from about 680° C. to about 710° C.

* * * * *